United States Patent
Chang et al.

(10) Patent No.: US 6,954,465 B2
(45) Date of Patent: Oct. 11, 2005

(54) DYNAMIC CHANNEL ASSIGNMENT

(75) Inventors: Li Fung Chang, Holmdel, NJ (US); Kapil K. Chawla, Scotch Plains, NJ (US); Justin Che-I Chuang, Holmdel, NJ (US); Bruce Edwin McNair, Holmdel, NJ (US); Xiaoxin Qiu, Bridgewater, NJ (US)

(73) Assignee: AT&T Corp., New York, NY (US)

( * ) Notice: Subject to any disclaimer, the term of this patent is extended or adjusted under 35 U.S.C. 154(b) by 780 days.

(21) Appl. No.: 09/791,200

(22) Filed: Feb. 22, 2001

(65) Prior Publication Data

US 2001/0048691 A1 Dec. 6, 2001

Related U.S. Application Data

(60) Provisional application No. 60/191,373, filed on Mar. 22, 2000.

(51) Int. Cl.[7] .............................. H04B 7/212
(52) U.S. Cl. ...................... 370/442; 370/347
(58) Field of Search ............... 370/317, 318, 370/329, 330, 332, 333, 337, 341, 347, 437, 442, 458, 465, 468, 336, 431, 436; 375/130, 131, 132, 148

(56) References Cited

U.S. PATENT DOCUMENTS 5,875,184 A 2/1999 Altvater et al.
5,926,501 A * 7/1999 Souissi et al. ............... 375/131
6,031,827 A * 2/2000 Rikkinen et al. ........... 370/330
6,134,230 A * 10/2000 Olofsson et al. ............ 370/337
6,501,785 B1 * 12/2002 Chang et al. ............... 375/133
6,587,498 B1 * 7/2003 Sarkola ...................... 375/132

FOREIGN PATENT DOCUMENTS

WO WO98/36600 8/1998
WO WO99/38344 7/1999

OTHER PUBLICATIONS

European Search Report, dated Jan. 4, 2002, taken from the European Patent Application No. 01200788.6.

* cited by examiner

Primary Examiner—Phirin Sam
(74) Attorney, Agent, or Firm—Henry T Brendzel

(57) ABSTRACT

This invention provides interference predictions, suitable for least interference dynamic channel assignment use or other frequency hopping uses by de-coupling the time slot assignment and the frequency hopping pattern assignment. In particular, a least interfered time slot is selected based on an aggregate interference measurement performed across an entire transmission band or a pre-specified range of frequencies in the transmission band. A user is assigned a least interfered time slot and provided an appropriate frequency hopping pattern.

17 Claims, 5 Drawing Sheets

DYNAMIC CHANNEL ASSIGNMENT

This non-provisional application claims the benefit of the U.S. provisional application Ser. No. 60/191,373 entitled "DYNAMIC CHANNEL ASSIGNMENT (DCA) ALGORITHM FOR SYSTEMS WITH RANDOM FREQUENCY HOPPING" filed on Mar. 22, 2000. The Applicant of the provisional application is CHANG et al. The above provisional application is hereby incorporated by reference including all references cited therein.

BACKGROUND OF THE INVENTION

1. Field of Invention

This invention is directed to methods and systems for providing frequency hopping in dynamic channel assignment (DCA) systems.

2. Description of Related Art

In a time division multiple access (TDMA) system, communication signals for a user may dynamically hop in a pattern over a two dimensional time slot-frequency domain based on a noise threshold in a band of interest. For example, least-interference based dynamic channel assignment (LI-DCA) algorithms assign time slot-frequency hopping patterns to a user as a function of channel interference or signal-to-interference-plus-noise ratio (SINR). Correspondingly, to implement LI-DCA, sophisticated SINR measurements are required for proper dynamic frequency channel assignments. However, due to limited processing capabilities in typical mobile units, it is difficult to implement LI-DCA. Therefore, there is a need for new dynamic channel assignment techniques.

SUMMARY OF THE INVENTION

This invention provides an approach for assigning users to time slots and frequency hopping patterns separately, by making a simple interference measurement. In particular, an aggregate interference power measurement is made across an entire transmission band or a portion of this band using a "sweeping" frequency synthesizer to select a time slot suitable for user assignment. Then, the user is assigned a frequency hopping pattern in the selected time slot.

These and other features and advantages of this invention are described in, or are apparent from, the following detailed description of various exemplary embodiments of the systems and methods according to this invention.

BRIEF DESCRIPTION OF THE DRAWINGS

This invention will be described in detail, with reference to the following figures, wherein.

DETAILED DESCRIPTION OF PREFERRED EMBODIMENTS

It is well appreciated that dynamic channel assignment systems often employ some measure of interference prediction before assigning users a time slot and a frequency hopping pattern. For example, LI-DCA systems measure, for each of the frequency channels slated for use, a signal-to-interference-plus-noise ratio (SINR). However, requiring frequency band by frequency band measurements in a timely manner requires significant processing capabilities, which most mobile units cannot readily accommodate.

This invention provides a sweep synthesizer least interfered dynamic channel assignment (SSLI-DCA) technique that separates time slot assignment from frequency assignment. Instead of tediously evaluating noise levels for each frequency at each time slot, the SSLI-DCA first selects a time slot based on a noise criterion and then selects a frequency hopping pattern after a time slot has been selected. This separation of time slot and frequency assignment permits the SSLI-DCA to assess noise levels for each time slot by frequency sweeping over frequency bands of interest. Using the frequency sweeping process, the SSLI-DCA generates a noise estimate value for each time slot. Noise estimates of multiple time slots are then used to select a time slot that may be assigned to a particular user. A frequency hopping pattern is assigned after the time slot selection is made. In this way, complex noise level evaluation is avoided and the amount of processing power in mobile stations may be reduced.

It is appreciated that, in the context of this invention, the term "noise" is understood to describe the combined effects of naturally occurring random signals and various interference signals generated from artificial sources, including signals generated by other communication systems.

Figure 1:
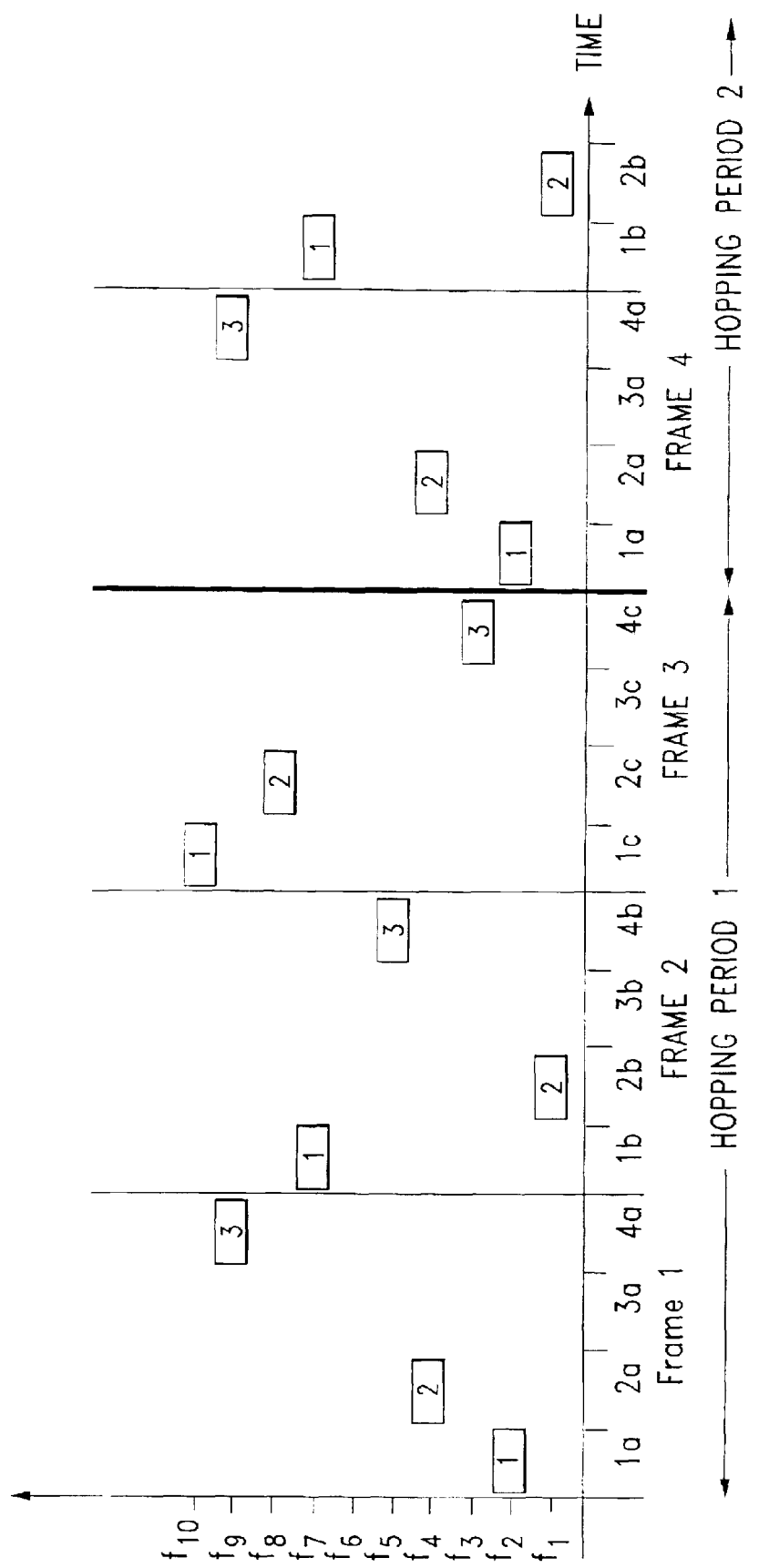
FIG. 1 is a diagram illustrating an exemplary Swept Synthesizer Least Interfered-Dynamic Channel Assignment (SSLI-DCA) distribution of signals according to their frequency, time, and energy value.

FIG. 1 is an exemplary diagram illustrating various time slot versus frequency bands for assorted users in an exemplary Swept Synthesizer Least Interfered-Dynamic Channel Assignment (SSLI-DCA) environment. Various users 1, 2, and 3 are designated least interfered time slots and frequency hopping pattern combinations within repeating time frames. For example, if time slot 3$a$ of frame 1 is determined to have too high an interference level to tolerate an added user, and time slots 1$a$, 2$a$ and 4$a$, in contrast, are determined to be least interfered time slots of the set of time slots 1$a$, 2$a$, and 4$a$, in frame 1, then users 1, 2 and 3 may be assigned, for example, time slots 1$a$, 2$a$ and 4$a$, respectively. User 1, assigned to time slot 1$a$ within time frame 1, may initiate its frequency hopping in a frequency band $f_2$, for example. User 2, assigned time slot 2$a$ may initiate its frequency hopping in frequency band $f_4$. User 3, assigned time slot 4$a$ within time frame 1, may initiate its frequency hopping in frequency band $f_9$, for example.

Since the frequency hopping patterns may be random, the frequency bands occupied by users 1, 2 and 3 may switch to other frequency bands in their respective time slots, in later time frames. For example, in time frame 2, users 1, 2, and 3 occupy frequency bands $f_7$, $f_1$, and $f_5$, respectively. Similarly, in time frame 3, users 1, 2 and 3, hop to frequency bands $f_{10}$, $f_8$ and $f_3$, respectively. If the measured interference levels in the frequencies of the respective time slots do not significantly change, then the set of hopping patterns in hopping period 1 will be repeated in subsequent hopping periods.

It is appreciated that while the above description refers to the various time slots occupying a time frame (e.g., frames 1–3), other forms of time blocking may be used. That is, instead of referring to time slots operating in contiguous time frames, other blocks or units of time, contiguous or non-contiguous, in the context of time frames or even time slots, may be used without departing from the spirit and scope of this invention. Also, while the above example shows one frequency hop per frame, multiple frequency hops may occur within each time slot for every frame.

As discussed above, overall interference levels may be evaluated on a time slot basis. Accordingly, users can be assigned to time slots with low or least interference levels. Subsequent to time slot assignments, the users can be provided with a frequency hopping pattern (e.g., random frequency hopping pattern).

Figure 2:
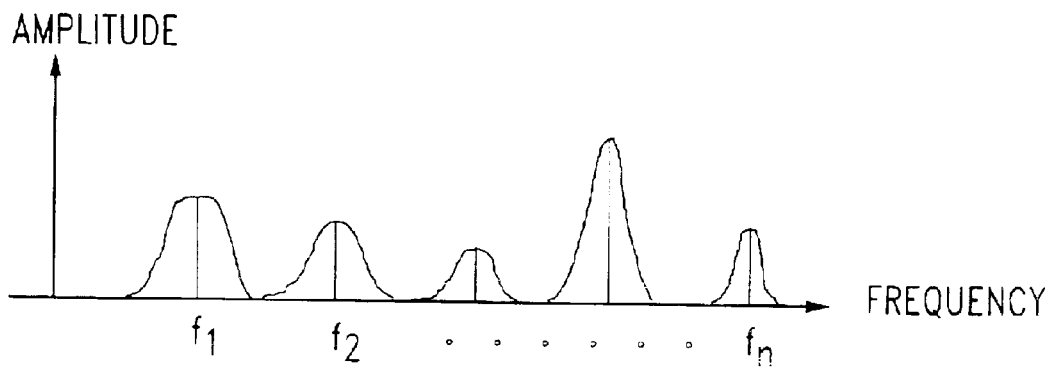
FIG. 2 is an illustration of various signals in multiple frequency bands.

FIG. 2 shows an exemplary diagram of an energy distribution across frequency bands $f_1$, $f_2$, $f_3$, . . . $f_n$ which correspond to potential "interference" levels for communication in these frequency bands. This interference energy may be estimated by the systems and techniques described below.

Figure 3:
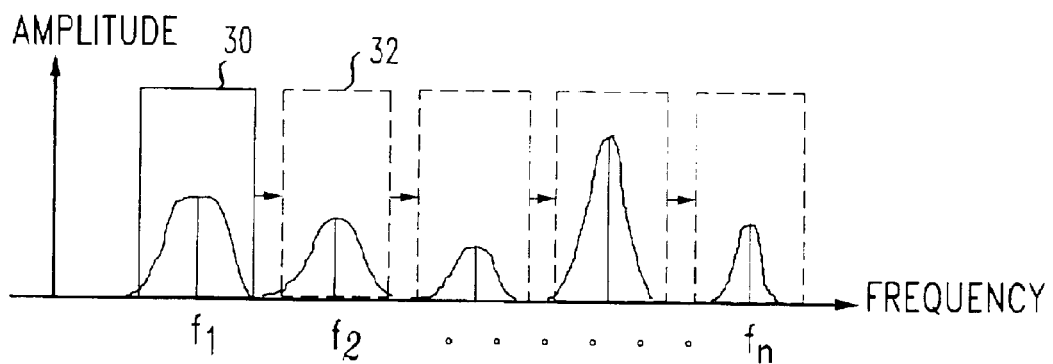
FIG. 3 is an illustration of a frequency hopping measurement scheme for the signals of FIG. 2.

As shown in FIG. 3, the energy in each frequency band may be measured by tuning a bandpass filter centered on each of the frequency bands. For example, after measuring the energy in a bandpass window position 30 around frequency band $f_1$, the bandpass window is "tuned" to the next position 32, centered around frequency band $f_2$. It is well appreciated that this process is repeated for the remaining frequency bands until all the frequency bands of interest are sampled. This process of "tuning" to the next frequency requires accurate frequency control to ensure that the bandpass window properly settles on the frequency band of interest before a measurement is initiated. Also, since any user, based on their hopping pattern, may be operating at any frequency band at any particular period, the above method must sample all frequencies in the various hopping bands for a predetermined dwell time of the hopping signal. This can be an inefficient process.

For example, if each frequency band is 200 kHz wide and the total hopping band range is 7 MHz, this would require the receiver to process all 200 kHz wide frequency bands in a 7 MHz range to accurately assess the interference level. Since the receiver does not know which frequency band the signal will hop to, the receiver must make, at a minimum, 35 (i.e., 7,000/200) measurements to determine the channel interference levels. Obviously, this creates great demands on a mobile receiver's noise performance, A/D speed and accuracy, and signal processing power.

Figure 4:
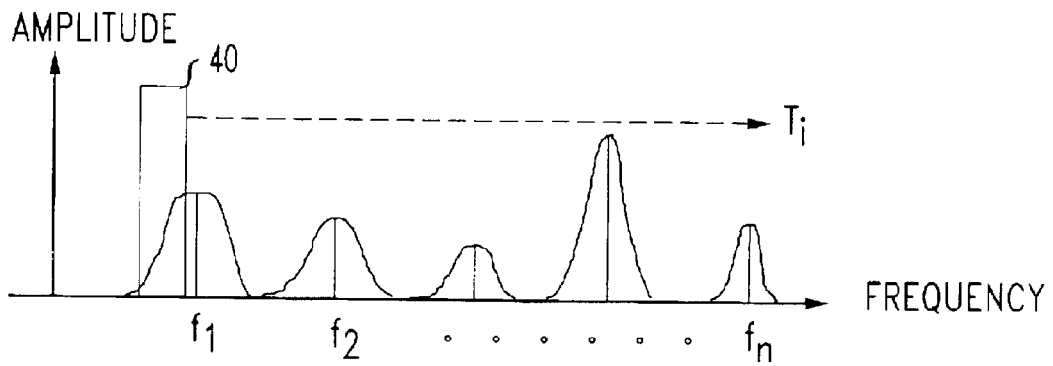
FIG. 4 is an illustration of an exemplary SSLI-DCA measurement scheme in the time domain.

FIG. 4 is a frequency diagram illustrating an exemplary SSLI-DCA estimation of interference levels by "sweeping" through all the frequencies of interest on a time frame/slot basis. As shown in FIG. 4, a narrowband filter 40 is swept through the frequency bands to obtain an averaged power measurement on a time slot basis ($T_1$). For example, the narrow band filter 40 may sweep frequency bands starting at a frequency $f_1$ and ending at frequency $f_n$. This frequency sweep may be performed to obtain interference energy on a time slot basis so that a time slot may be selected for assignment to a mobile station.

As the narrow band filter 40 is continuously swept, it accumulates a running average of the measured power within a measured time slot. All the frequencies of interest may be swept within a time interval corresponding to a time slot of one frame or in the same time slot for multiple frames. Multiple frames may be used to accumulate an average interference measurement if the sweep rate and frequency bandwidth are such that insufficient time is available to sweep the complete frequency bands of interest in a single time slot interval.

Because the filter 40 is being swept versus "tuned", the exemplary narrow band filter does not need to stabilize on any particular frequency band during measurement. Therefore, it would be feasible to sweep the frequency bands of interest several times within a given time slot to allow time averaging to improve the aggregate interference measurement. Further, because a sweep is being performed rather than a "tuning", the slew rate of the sweeping receiver is no longer a critical factor. Additionally, since only average power measurements are being performed across the different frequency bands, complicated signal-specific processing or signal-synchronized processing is not needed. Accordingly, the requirements for mobile units are substantially reduced.

Figure 5:
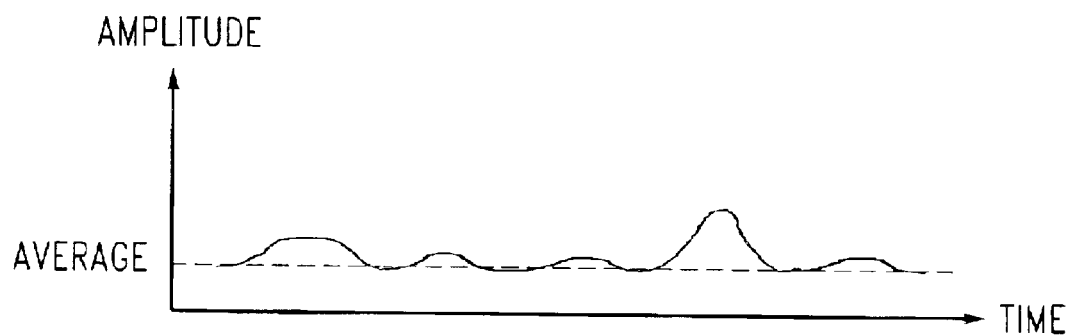
FIG. 5 is an illustration of an exemplary measurement response of the exemplary SSLI-DCA measurement scheme of FIG. 4.

FIG. 5 shows an exemplary interference measurement result of the frequencies shown in FIG. 4. As different frequency bands of interest are sampled, their respective sampled values are averaged in the time domain to provide an average interference energy for the time slot. The average interference level provides a convenient metric to compare the interference levels of different time slots.

Figure 6:
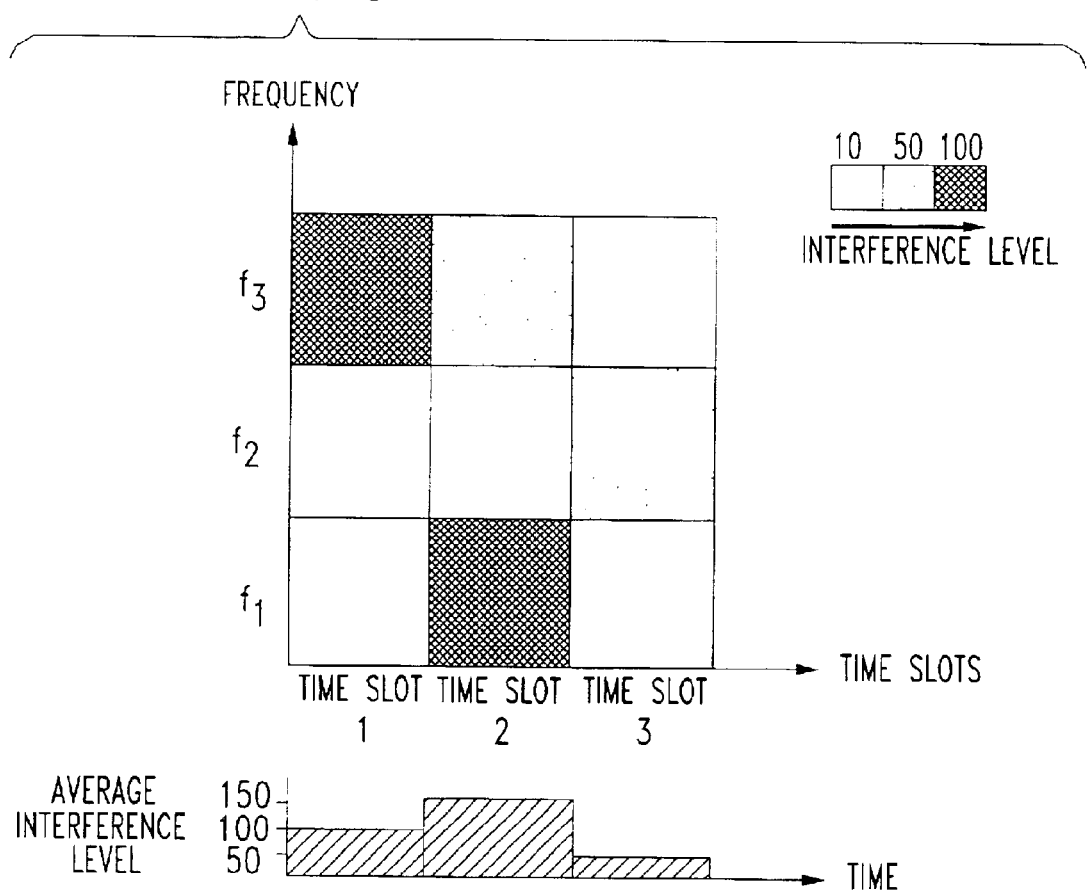
FIG. 6 is a graph illustrating an exemplary measured SSLI-DCA interference profile versus frequency and time.

FIG. 6 illustrates exemplary interference levels for three arbitrary time slots 1, 2, and 3 in three respective frequency bands of interest. For example, using an exemplary SSLI-DCA measurement scheme, time slot 1 may be determined to contain a medium interference level from the aggregate of signals measured in frequency bands $f_1$, $f_2$, and $f_3$; time slot 2 may also be determined to contain a high interference level; and time slot 3 may also be determined to contain a low interference level, for example. Given the interference profile illustrated in FIG. 6, the exemplary SSLI-DCA process may select time slot 3 as the least interfered time slot and, therefore, assign a user to that time slot.

Figure 7:
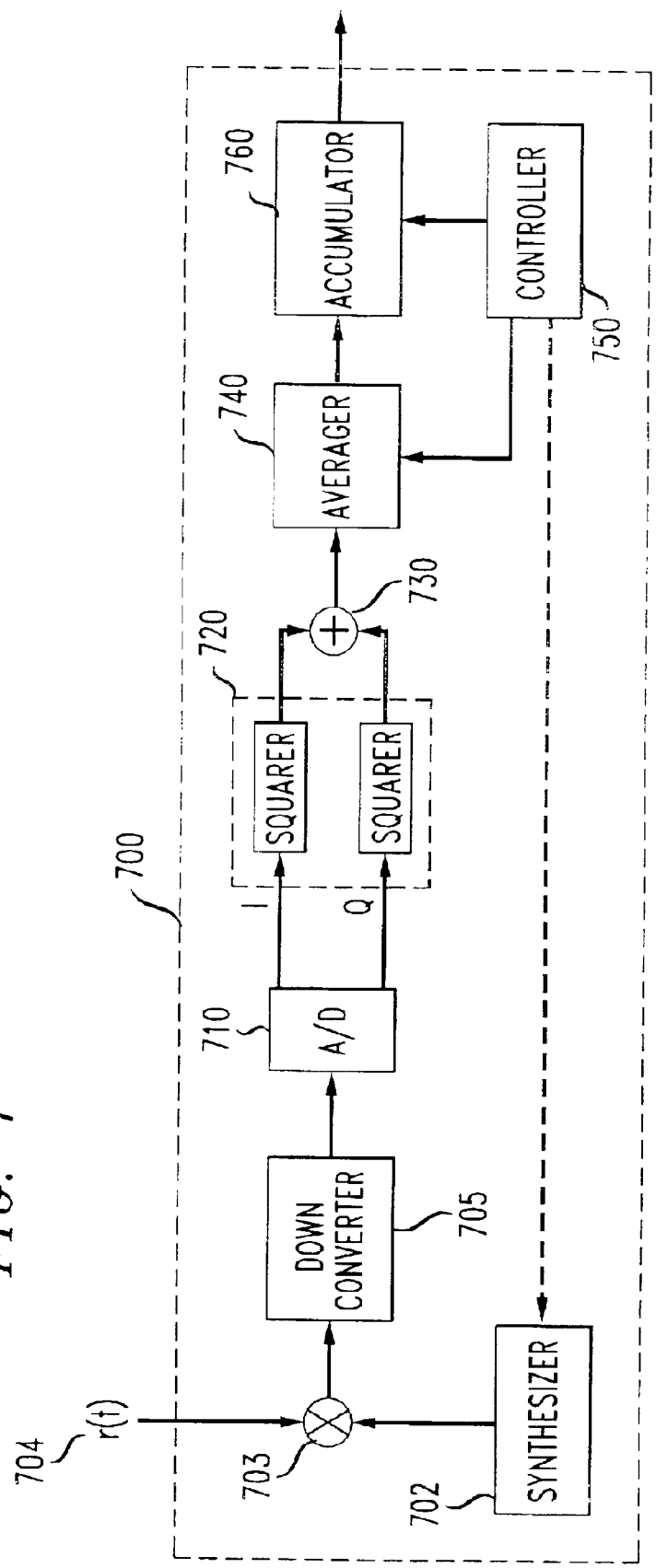
FIG. 7 is a block diagram illustrating an exemplary signal processing device suitable for SSLI-DCA.

FIG. 7 shows an exemplary SSLI-DCA device 700. The functions of the elements of the exemplary SSLI-DCA device 700 are described as follows: a frequency agile synthesizer 702 (e.g., voltage controlled oscillator) is mixed with a received signal r(t) 704 via a mixer 703. The received signal r(t) 704 is a signal received from an external antenna or receiving device. It is appreciated that the synthesizer 702 may operate in a linear sweeping fashion, or hop from frequency to frequency in any manner of interest, as desired.

The resulting signal from the mixer 703 is processed by a down-converter 705 which further filters the signal and converts the signal to a more suitable intermediate frequency for processing and filtering. It is appreciated that down-converters are well known in the art and that various down-converting systems and methods may be used without departing from the spirit and scope of this invention.

The down-converted signal is passed onto an analog-to-digital (A/D) digital converter 710. The A/D converter 710 digitizes the signal and further apportions the signal into its real and imaginary parts I and Q, respectively. It is appreciated that the apportioning into the real and imaginary parts may be accomplished through the A/D converter 710 or through a real and imaginary splitting device (not shown) anywhere before or after the A/D converter 710. The real and imaginary components are operated on by a square generator 720 and are added in the summer 730 to produce a power representation. The power representation is then time averaged over designated time slots in the averager 740. The controller 750 provides the averager 740 with time slot indices (e.g., i) and increments time slot values used in the averager 740 and a power accumulator 760. The controller 750 may optionally provide feedback and control to the synthesizer 702 based on time index values (e.g., i) or other parameters, as desired. Moreover, the controller may control operation of the averages 740 and the accumulator 760. The power accumulator 760 accumulates the average power measured for a given time slot i and forwards the averaged measured power to an external controller (not shown). The external controller may assign users to time slot-frequency patterns according to the various systems and methods described in this invention.

It is appreciated that while FIG. 7 illustrates an analog synthesizer system for down-converting the received signal r(t) 704 to an intermediate frequency, it should be apparent that one of ordinary skill may down-convert using digital methods or systems. Further, while the exemplary embodiments illustrate SSLI-DCA systems or methods in the context of a "receiving" mode, it is apparent that the above discussed systems and methods can be equally applied to a "transmitting" mode. For example, if the signal/noise environment experienced by both the receiver system and the transmitting system are predictably correlated, then the exemplary embodiments of this invention can be applied to a transmitter station, acting as a proxy to the receiving systems.

It is appreciated that during these power measurements the exemplary SSLI-DCA system does not need to process any information other than the total power of a given time slot. Therefore, no signal-specific processing or signal-synchronized processing is required. Further, while the measured average power is associated with designated time slots, it is appreciated that other time periods, e.g., fractions of time slots or combinations of time slots or other enumerations, thereof, may be used without departing from the spirit and scope of this invention.

It should be apparent to one of ordinary skill that the slew rate of the synthesizer 702 can be chosen to optimize spurious responses, while still allowing the synthesizer to stabilize on the frequencies of interest within the required time slot. Accordingly, the synthesizer will only need to be stable within a small percentage of the operating frequency within the time slot interval to enable appropriate modulation of the receive signal. Therefore, it should be apparent that, for simple time slot power measurements, very accurate frequency control is not needed. Hence, the synthesizer can be operated to "chirp" across the bands of interest.

Figure 8:
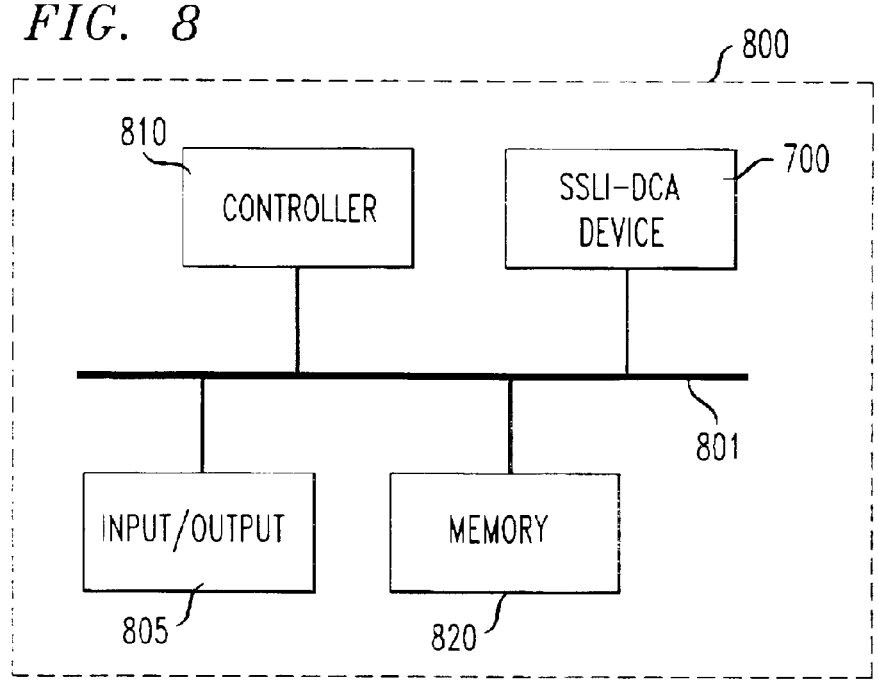
FIG. 8 is a block diagram an exemplary SSLI-DCA system.

FIG. 8 illustrates a block diagram of an exemplary SSLI-DCA system 800. The exemplary SSLI-DCA system 800 contains a controller 810, SSLI-DCA device 700, memory 820, and an input/output (I/O) interface 805 connected by a signal/database 801. The I/O interface 805 may be connected to an antenna (not shown) or multiple antennas (also not shown). The controller 810 controls the functions of the SSLI-DCA device 700. The SSLI-DCA device 700 performs dynamic channel allocation measurements in accordance to the principles explained above. Further, the SSLI-DCA device 700 may, independently or in coordination with the controller 810 or an external device (not shown), generate frequency hopping assignments for selected time slots. The controller 810 operates to control the SSLI-DCA device 700 and communicates to external devices or systems (not shown) via I/O interface 805. The controller 810 may coordinate, individually or in the aggregate, other devices, shown or not shown, connected to this signal-databus 801. The signal/databus 801 may be any form of a communication bus, wired or wireless. It should be appreciated that the controller 810 may be a special purpose computer, programmed microprocessor, or micro-controller, ASIC, or logically devices such as a programmable logic device, such as PLD, PLA, FPGA, or the like. In particular, the SSLI-DCA system 800 may be implemented as part of a mobile or fixed communication system, wherein the controller is contained within the SSLI-DCA system 800 or may be contained external to the SSLI-DCA system 800, or, alternatively, contained external to the mobile or fixed communication system.

Similarly, the memory 820 may be contained in the SSLI-DCA system 800, providing support capabilities consistent with a memory-like device, or maybe contained external to the SSLI-DCA system 800. Further, the memory may be integrated into the controller 810 or into the SSLI-DCA device 700, as desired.

It is appreciated that the above SSLI-DCA system 800 may be implemented in hardware as a single unit or may be implemented as stages. That is, a portion of the SSLI-DCA system 800 may be situated separately from another portion of the SSLI-DCA system 800 in a hardware system. For example, the frequency synthesizing components of the SSLI-DCA device 700 may be configured separately and external to the SSLI-DCA system 800.

Figure 9:
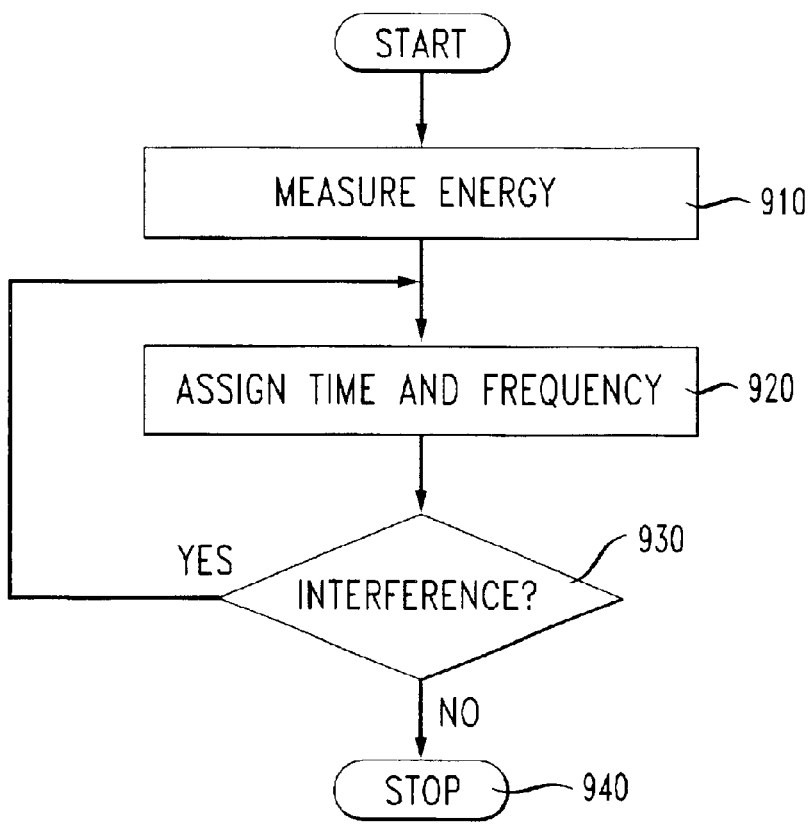
FIG. 9 is a flowchart outlining an exemplary SSLI-DCA process.

FIG. 9 is a flowchart illustrating an exemplary process of SSLI-DCA. Beginning in step 910, the process measures the aggregate interference energy or amplitude across an entire transmission spectrum or portions within the spectrum for a given time slot or set of time slots. Depending on the sweeping speed of the frequency sweeping mechanism, the spectrum measurement may occur multiple times in a time slot or set of time slots. Step 910 may further average these measurements over a shorter or longer time period, as desired. It is appreciated that step 910 may be accomplished by an exemplary SLI-DCA device, as illustrated in FIGS. 7 and 8. The measured interference values for each of the respective time slots are then passed on to step 920. Step 920 evaluates the measured interference values and selects a time slot within a time frame, based on its "least" aggregate interference, and an appropriate frequency hopping pattern within that selected time slot to a user. The process then proceeds to step 930. Step 930 evaluates the transmission quality and interference for the selected time slot and frequency hopping pattern. If step 930 does not discover more than an arbitrary or predetermined number of errors during a quality reporting period, it proceeds to step 940 and ends. If, however, more than an arbitrary or predetermined number of errors occur during a given quality reporting period, step 930 initiates a reassignment of a user to another time slot by either assigning another time slot and/or random frequency hopping pattern or renegotiating with the process of step 920 for another time slot and/or random frequency hopping pattern. After successful reassignment, the process continues to step 940 and ends. It is appreciated that step 920 and 930 may be accommodated by an exemplary SSLI-DLA system, as illustrated in FIG. 8.

The above-outlined process may be repeated at periodic or aperiodic intervals to provide "most" current evaluations of the aggregate noise/interference in the time periods or these slots of interest. Further, the above-outlined exemplary process may be modified with many different alternatives or variations as apparent to those skilled in the art. For example, step 930 may be altogether eliminated or incorporated immediately after step 910, without departing from the spirit and scope of this invention. Also, other testing phases relating to the measured signals or power/error analysis schemes may be added to the above-outlined process, as desired. From the above discussion, it should be apparent that the above-outlined exemplary process may be readily implemented in software that can be used in a variety of hardware systems.

Each of the elements shown in FIGS. 8–9 may be implemented as portions of a larger SSLI-DCA system. Alternatively, these elements may be implemented in a single device or system or further separated into physically distinct component or discrete elements, as within the purview of one of ordinary skill.

It is appreciated that while this invention describes methods and systems relating to TDMA implementations, it is apparent that other communication systems that are capable of sharing a system capacity with a plurality of terminals (e.g., assigning various users to one or more intervals of time as primary user) can be used. Thus, various exemplary embodiments of the invention may be applied to combinations of assorted TDMA systems that share one or more system capacities While this invention has been described in conjunction with specific embodiments thereof, it is evident that many alternatives, modifications, and variations will be apparent to those skilled in the art. For example, it should be appreciated that the receiver structure of FIG. 7 is simply illustrated and that the various embodiments of this invention may be implemented using different receiver structures without departing from the spirit and scope of this invention. Accordingly, exemplary embodiments of the invention as set forth herein are intended to be illustrative and not limiting. Thus, changes that may be made without departing from the spirit and scope of the invention.

What is claimed:

1. A method for dynamic channel assignment in a time division multiple access (TDMA) scheme, comprising:
   obtaining an average energy within a predetermined frequency range for each of the time slots;
   comparing the average energy of each of the time slots to at least a threshold value;
   selecting a time slot with an acceptable noise level;
   assigning a time slot to a user; and
   assigning a frequency hopping pattern to the user.

2. The method of claim 1, wherein the threshold value is predetermined before the comparing the average energy step.

3. The method of claim 1, wherein the threshold value is determined after the comparing the average energy step.

4. The method of claim 1, wherein the selecting the time slot selects one of the time slots that has a corresponding average energy that is less than a threshold value.

5. The method of claim 1, wherein the selecting the time slot selects one of the time slots that has a corresponding average energy that exceeds the threshold value and that has a lowest magnitude.

6. The method of claim 1, wherein the selecting the time slot selects a time slot with a minimum average energy.

7. The method of claim 1, wherein the obtaining an average energy comprises:
   providing a narrow band filter; and
   sweeping the narrow band filter across a set of contiguous frequencies within the predetermined frequency range.

8. The method of claim 7, wherein the sweeping is performed for a specific time slot across multiple frames, the method further comprising:
   obtaining a partial average energy for each set of contiguous frequencies corresponding to each of the frames, sets of contiguous frequencies of all the multiple frames covering the predetermined frequency range; and
   combining partial average energies of the multiple frames to obtain the average energy for the predetermined frequency range.

9. The method of claim 8, wherein the sweeping is performed for multiple time slots across multiple time frames.

10. A dynamic channel assignment device operating in a time division multiple access (TDMA) scheme, comprising:
    an I/O interface;
    a controller coupled to the I/O interface, the controller first assigning a time slot; and then assigning a frequency hopping pattern; and
    an energy measuring device;
    where the energy measuring device measures noise levels of time slots across a predetermined frequency range, the controller selects said time slot to be one that has an acceptable noise level; and the energy measuring device obtains an average energy within the predetermined frequency range for each of the time slots, the average energy of each of the time slots being compared to a predetermined threshold.

11. The device of claim 10, wherein the energy measuring device obtains the average energy by sweeping a narrow band filter across a set of contiguous frequencies within the predetermined frequency range.

12. The device of claim 11, wherein the energy measuring device sweeps a specific time slot across multiple frames, the energy measuring device:
    obtains a partial average energy for each set of contiguous frequencies corresponding to each of the frames, sets of contiguous frequencies of all the multiple frames covering the predetermined frequency range; and
    combines partial average energies of the multiple frames to obtain the average energy for the predetermined frequency range.

13. The device of claim 10, wherein the controller selects one of the time slots that has a corresponding average energy that is below a predetermined threshold.

14. The device of claim 10, wherein the controller selects one of the time slots that has a corresponding average energy that is below a predetermined threshold and that has a lowest magnitude.

15. A method for dynamic channel assignment in a time division multiple access (TDMA) scheme, comprising:
    obtaining an average energy within a predetermined frequency range for each of the time slots;
    selecting a time slot with a minimum average energy;
    selecting a time slot with an acceptable noise level;
    assigning a time slot to a user; and
    assigning a frequency hopping pattern to the user.

16. A method for dynamic channel assignment in a time division multiple access (TDMA) scheme, comprising:
    measuring noise levels of time slots across a predetermined frequency range;
    selecting a time slot with an acceptable noise level;
    assigning a time slot to a user; and
    assigning a frequency hopping pattern to the user where the noise measurement comprises measurement of naturally occurring random signals, and various artificially generated interference signals, including those generated by other communications systems.

17. A method for dynamic channel assignment in a time division multiple access (TDMA) scheme, comprising:
    measuring noise levels of time slots across a predetermined frequency range;
    selecting a time slot with an acceptable noise level;
    assigning a time slot to a user; and
    assigning a frequency hopping pattern, to the user where the step of measuring is performed with a sweeping filter operation.

* * * * *